United States Patent Office 2,948,703
Patented Aug. 9, 1960

2,948,703

METHOD FOR POLYMERIZING STYRENE AND ACRYLONITRILE IN THE PRESENCE OF POLYBUTADIENE AND STYRENE-ACRYLONITRILE COPOLYMER LATICES AND PRODUCT OBTAINED THEREBY

Juel P. Schroeder, Springfield, N.J., assignor to Union Carbide Corporation, a corporation of New York No Drawing. Filed Apr. 30, 1956, Ser. No. 581,278

12 Claims. (Cl. 260—45.5)

This invention relates to a method for the preparation of styrene-acrylonitrile grafted polymers. More particularly, it concerns an improved method for preparing styrene-acrylonitrile grafted copolymers of polybutadiene particularly characterized by improved heat processability.

It is known that styrene and acrylonitrile can be graftpolymerized onto a butadiene-containing polymeric composition to yield tough, rigid products. According to British Patent 649,166 (1951) a thermoplastic styreneacrylonitrile grafted polymer can be prepared by polymerizing styrene and acrylonitrile monomers onto a butadiene-styrene copolymer. These grafted polymers generally are quite hard and non-elastic at ordinary temperatures. As with most thermoplastic compositions, physical properties of these grafted polymers are sharply dependent on the environmental temperature in that they tend to become softer and more flexible as the temperature is increased and conversely become more rigid and brittle as the temperature is decreased. At extremely low temperatures, such as below −20° C., the compositions of this patent are very brittle and have low impact strengths.

More recently, it has been discovered (Fremon and Stoops, British Patent 744,455, published February 8, 1956) that improved grafted compositions can be made by copolymerizing styrene and acrylonitrile onto polybutadiene. These compositions have greatly improved mechanical properties, particularly at low temperatures. Such products generally have brittle temperatures below about −20° C. and a stiffness modulus of elasticity at 30° C. of at least 50,000 p.s.i. These products have unusually high impact strengths and resistance to shattering, and these properties are retained at temperatures well below −20° C.

However, difficulties are encountered in processing these styrene-acrylonitrile grafted polybutadiene compositions because of their toughness and strength at elevated temperatures. Kneading, milling, and calendering of such products is accomplished only with difficulty, and over long periods of time. Such working requires high milling temperatures and only after long mill breakdown is a smooth, tractable plastic sheet obtained.

I have now discovered that the hot processability of styrene-acrylonitrile grafted polybutadiene compositions can be greatly improved without an impairment of low temperature characteristics and other mechanical properties by preparing such compositions in a novel manner which includes the steps of first forming a mixture of a latex essentially comprised of polymerized butadine, and of a latex of a styrene-acrylonitrile copolymer composed predominantly of styrene, then adding styrene and acrylonitrile monomers to said mixture of latices, and polymerizing said monomers by heating the monomerscontaining mixture in the presence of a polymerization catalyst or initiator.

The manner of preparing the starting polybutadiene is not narrowly critical. For proper graft polymerization in the practice of this invention it should be employed in the latex form. Preferably, the polybutadiene latex is prepared by polymerizing butadiene as essentially the sole monomer, to a polybutadiene of a relatively high molecular weight, such as one having a Mooney plasticity number of at least 80. Excellent results are achieved when the polymerization of the butadiene is conducted in the presence of a polymerization catalyst at a temperature below about 60° C. Although a wide variety of polymerization conditions can be employed, emulsion polymerization techniques using a free radical catalyst are preferred.

The latex of the preformed styrene-acrylonitrile copolymer which is added to the polybutadiene latex prior to the graft polymerization is a copolymer composed predominantly of styrene. The preferred composition of the copolymer is about 65 to 75 percent styrene and 25 to 35 percent acrylonitrile.

A typical example of the preparation of the styreneacrylonitrile copolymer latex is as follows:

|  | Parts by weight |
|---|---|
| Water | 300 |
| Potassium oleate | 2 |
| Tertiary-dodecyl mercaptan | 0.167 |
| Styrene | 70 |
| Acrylonitrile | 30 |
| Potassium persulfate | 0.2 |

The first five of these ingredients are heated with stirring to about 50° C. and the polymerization initiator, the potassium persulfate, is added. The mixture is then heated preferably with agitation to about 80° C. to 90° C. and held for about one hour. The resulting emulsion contains about 24 percent total polymer solids, with a resin yield of about 94 percent. The copolymer resin has a reduced viscosity in methyl ethyl ketone at 25° C. of about 1.0 and contains about 25–27 percent combined acrylonitrile.

I have found that to secure the desired milling characteristics in the grafted polybutadiene, the preformed styrene-acrylonitrile copolymer resin should be added as a latex to the polybutadiene latex in amounts from about ½ part to 1½ parts by weight per part of polybutadiene.

The graft polymerization is achieved by adding the styrene and acrylonitrile monomers to the resultant mixture of polybutadiene and styrene-acrylonitrile latices and the entire mixture heated to the polymerization temperature. A polymerization catalyst, preferably a free-radical catalyst, such as potassium persulfate, ammonium persulfate, or hydrogen peroxide, is added in an amount of about 1 to 2 percent by weight of the total monomers present to effect the polymerization.

The styrene and acrylonitrile monomers employed in the graft polymerization can be present in amounts of about one to three parts by weight of total monomers per part of polybutadiene, with the ratio of styrene to acrylonitrile in the total monomers preferably being about two to three parts of styrene per part of acrylonitrile.

The polymerization preferably is conducted under an inert atmosphere, for example nitrogen, at temperatures within the range of about 30° C. to 90° C. and preferably at about 80° C. The reaction can be carried to 100 percent conversion of the styrene and acrylonitrile monomers. However, if the conversion is not complete, unreacted monomers can be recovered by steam distillation.

In the practice of this invention, the preferred procedure is to add the styrene-acrylonitrile copolymer latex and the styrene and acrylonitrile monomers in their entirety to the polybutadiene latex, heating the mixture to the polymerization temperature and adding the polymerization initiator or catalyst. As an alternative, however, the polybutadiene, styrene-acrylonitrile copolymer latex and catalyst can be heated to the polymerization temperature and the styrene and acrylonitrile monomers, either in admixture or separately, slowly added to the reaction mixture.

The grafted polybutadiene polymer can be recovered from the reaction emulsion by known means, for example, coagulating the emulsion by the addition of an acidified aqueous salt solution and filtering, washing and drying the precipitated resin-rubber composition.

While the mechanism of the reaction occurring in this process is not completely understood, it has been established that part of the styrene and acrylonitrile combines chemically with the polybutadiene as polymeric grafts, that is, grafted on the polybutadiene in the form of side chains of indeterminate length. It is contemplated that some free styrene-acrylonitrile copolymer is also present that is not chemically combined with the grafted polybutadiene. For purposes of comparison of these products, their composition can be expressed in terms of a resin to rubber ratio, the resin component being represented by the amount of styrene and acrylonitrile grafted to the polybutadiene plus the amount of free styrene-acrylonitrile copolymer in the composition. The rubber component is represented by the amount of polybutadiene initially used. The preferred compositions of the grafted polybutadiene are those having a resin to rubber ratio ranging from about 65:35 to about 75:25. Such compositions have good resistance to solvents such as gasoline, lubricating oil, carbon tetrachloride, and the like. They possess good mechanical properties, in particular a desirable combination of rigidity and shock resistance at low temperatures.

Neither the distribution nor length of the grafted chains on the polybutadiene are presently capable of exact analytical determination. However, the amount of grafting can be approximated by the following test. Pellets or granules of a reaction product from the procedure herein described is immersed in dimethyl formamide, a known solvent for the copolymers of styrene and acrylonitrile but in which the polybutadiene and the grafted polybutadiene may swell in size, but are otherwise insoluble. Specifically, 100 grams of the reaction product are dispersed in about 400 to 1000 cc. of dimethyl formamide for 24 to 48 hours at room temperature to extract any styrene-acrylonitrile copolymers from the reaction product by dissolution. Usually 2 to 5 successive extractions with fresh solvent in each extraction are sufficient to bring the insoluble components of the reaction product to a constant dry weight. Solvent removal, i.e., drying to constant weight of the insoluble component, can be carried out by placing it in a vacuum (10–15 mm. Hg) at 30° C. to 50° C. The weight of the finally isolated insoluble product minus the weight of the polybutadiene in the original sample gives the weight of styrene and acrylonitrile which has grafted or combined onto the polybutadiene. From the data obtained in this procedure, the degree of grafting is determined as the weight of grafted styrene and acrylonitrile per 100 parts by weight of the original polybutadiene.

The following examples are illustrative. All parts are parts by weight.

EXAMPLE 1

Three hundred sixty-five parts of a latex containing 120 parts of polybutadiene and 3 parts potassium oleate as an emulsifying agent were mixed with 600 parts of latex containing 140 parts of styrene-acrylonitrile copolymer (75 percent styrene, 25 percent acrylonitrile). These mixed latices were diluted with 300 parts water and a mixture of monomers containing 126 parts styrene and 54 parts acrylonitrile was added. The mixture was heated with stirring to 80° C.–90° C.; 2.1 parts potassium persulfate added and the heating continued for two hours under reflux, maintaining a temperature of 80° C.–90° C. The reaction product was cooled to room temperature, coagulated by addition of an acidified aqueous sodium chloride solution, and the precipitated resin filtered off and then washed and dried. Total polymer solids recovered amounted to 420 parts having a degree of grafting of 6.4 as determined by extraction with dimethyl formamide. The composition of the solids amounted to about 30 percent grafted polybutadiene and about 70 percent styrene-acrylonitrile copolymer or a resin/rubber ratio of 72/28. The product was milled at 170° C. to a smooth sheet in five minutes. Physical properties of the resin are shown in Table I.

EXAMPLE 2

Three hundred sixty-five parts of a latex containing 120 parts polybutadiene and 3 parts potassium oleate as an emulsifying agent were mixed with 429 parts of a latex containing 100 parts of styrene-acrylonitrile copolymer (75 percent styrene, 25 percent acrylonitrile). To these mixed latices was added 500 parts of water and a mixture of monomers containing 154 parts styrene and 66 parts acrylonitrile. The resultant mixture was heated with stirring to 80° C.–90° C. and 2.1 parts potassium persulfate added. The heating was continued for two hours under reflux, maintaining a temperature of 80° C.–90°C. The reaction product was cooled to room temperature, coagulated as described in Example 1 and the precipitated resin filtered off, then washed and dried. Total polymer solids recovered amounted to 421 parts having a degree of grafting of 27, as determined by extraction with dimethyl formamide. The composition of the solids amounted to about 36.5 percent grafted polybutadiene and about 63.5 percent styrene-acrylonitrile copolymer, having a resin/rubber ratio of 71/29. The product was milled at 170° C. to a smooth sheet in six minutes. Physical properties of the resin are shown in Table I.

EXAMPLE 3

Three hundred sixty-five parts of latex containing 120 parts of polybutadiene and 3 parts potassium oleate as an emulsifying agent were mixed with 258 parts of latex containing 60 parts of a copolymer of styrene and acrylonitrile (75 percent styrene, 25 percent acrylonitrile). To these mixed latices were added 700 parts of water and a mixture of monomers containing 182 parts styrene and 78 parts acrylonitrile. The resulting mixture was heated with stirring to 80° C.–90° C., and 2.1 parts potassium persulfate added. The heating was continued for two hours under reflux, maintaining a temperature of 80° C.–90° C. The reaction product was cooled and the solids recovered by coagulation as described in Example 1. Total polymer solids amounted to 412 parts with a degree of grafting of 55.8. The composition of solids amounted to about 42 percent grafted polybutadiene and about 58 percent styrene acrylonitrile copolymer, having a resin/rubber ratio of 71/29. The material was milled at 170° C. to a smooth sheet in eight minutes. Physical properties of the resin are shown in Table I.

The degree of grafting appears to be controlled by the amount of preformed styrene-acrylonitrile copolymer present during the graft polymerization, there being proportionally less grafting in the product as the amount of preformed copolymer is increased. This effect is shown in Table I following. In the examples described above whose properties are reported in Table I, the amount of original preformed styrene-acrylonitrile copolymer is varied over a considerable range, and the amount of polymerizable monomers added is adjusted accordingly to obtain a final resin to rubber ratio of about 70/30. In this manner the products can be compared justifiably, one with another, as to properties. The milling time required to produce a smooth tractable sheet was determined by milling the copolymer on a steam heated two roll mill, using standard milling techniques. Each roll had a diameter of 6 inches and a length of 12 inches with a space gap between the rolls of about ⅛ inch. One roll had a peripheral speed of 35 feet per minute and the other a speed of 40 feet per minute. A charge of about 400 grams of the grafted polybutadiene produced as in the aforementioned examples was placed in the mill, and milled at a temperature of about 170° C.

*Table I*

|  | Example 1 | Example 2 | Example 3 |
|---|---|---|---|
| Initial Resin-Rubber Ratio [1] | 140/120 | 100/120 | 60/120 |
| Styrene-Acrylonitrile Monomer Ratio [1] | 126/54 | 154/66 | 182/78 |
| Total Monomers | 180 | 220 | 260 |
| Final Resin-Rubber Ratio | 72/28 | 71/29 | 71/29 |
| Degree of Grafting | 6.4 | 27.0 | 55.8 |
| Milling Time at 170° C. (mins.) | 5 | 6 | 8 |
| Flexural Strength (p.s.i.) | 5,650 | 5,900 | 6,400 |
| Flexural Modulus (p.s.i.) | 230,000 | 240,000 | 230,000 |
| Tensile Strength (p.s.i.) | 2,800 | 3,400 | 3,800 |
| Izod Impact strength (ft. lbs./inch of notch): |  |  |  |
| at 70° F | 10.4 | 12.5 | 9.7 |
| at −20° F | 3.0 | 7.8 | 6.2 |

[1] Values are in parts by weight.

Physical properties of the products made by my process and those of the British Patent 744,455 having equivalent resin to rubber ratios, have substantially equivalent strengths, and Izod impact strength, even at low temperatures. This last feature is particularly desirable since these products, when molded, extruded, or otherwise heat shaped, are quite useful in low temperature applications, such as in arctic equipment, as for example instrument housings and shock pads, in cooling and refrigeration equipment, and in other applications where exposure of plastic articles to low temperature is encountered and where a high resistance to shattering is desired. The high strength characteristics of these grafted polybutadienes of the present invention also find particular utility in the manufacture therefrom of molded articles, such as protective helmets and pads, toys, food trays, tote boxes, luggage, and carrying cases, refrigerator and automobile parts as scuff pads, instrument and door panels, crash pads, window frames, and like uses.

The rapid heat processability of the grafted polybutadienes made according to the present invention is exemplified by the stated milling times of 5 minutes, 6 minutes, and 8 minutes for the products prepared according to Examples 1, 2, and 3, respectively, as shown in Table I. On the other hand, it required at least 18 to 22 minutes of milling under the same conditions to obtain a smooth tractable sheet from the grafted polybutadiene polymers prepared according to British Patent 744,455, which contained an equivalent resin to rubber ratio of about 70/30. Moreover, in addition to better heat processability, the physical properties of the products of this invention are as good as, or superior to, those of the products described in the British patent.

I claim:

1. In the process for forming a shock-resistant solid styrene-acrylonitrile grafted polybutadiene, the steps which include admixing (a) a latex of polybutadiene and (b) a latex of a styrene-acrylonitrile copolymer, composed predominantly of styrene polymerized therein, in amounts of about 0.5 part to about 1.5 parts by weight of said copolymer per part of said polybutadiene, adding styrene and acrylonitrile monomers to said mixture of latices, heating the monomers-containing mixture in the presence of a free radical polymerization catalyst and polymerizing the styrene and acrylonitrile to form a homogeneous thermoplastic polymeric product characterized by good heat processability.

2. The process according to claim 1 wherein the homogeneous thermoplastic product has a resin to rubber ratio between about 65:35 to about 75:25, wherein the resin component represents the amount of styrene and acrylonitrile grafted to the polybutadiene plus the amount of free styrene-acrylonitrile copolymer present and the rubber component represents the amount of polybutadiene initially present.

3. In the process for forming styrene-acrylonitrile grafted polybutadiene resin, the steps which include admixing (a) a latex of polybutadiene having a Mooney plasticity number of at least 80, (b) a latex of a styrene-acrylonitrile copolymer composed of between about 65 to about 75 percent styrene and 25 to 35 percent acrylonitrile respectively polymerized therein, in amounts of about 0.5 parts to about 1.5 parts by weight of said copolymer per part of said polybutadiene, and (c) styrene and acrylonitrile monomers in amounts of between about one to three parts of total monomers per part of polybutadiene, said monomers containing between about 2 parts to about 3 parts by weight of styrene per part of acrylonitrile, heating the mixture in the presence of a free radical polymerization catalyst until a homogeneous thermoplastic polymeric product is formed having a resin to rubber ratio of between about 65:35 to about 75:25, wherein the resin component represents the amount of styrene and acrylonitrile grafted to the polybutadiene plus the amount of free styrene-acrylonitrile copolymer present and the rubber component represents the amount of polybutadiene initially present.

4. A process for producing styrene-acrylonitrile grafted polybutadiene resins which includes the steps of mixing with a latex of a polybutadiene having a Mooney plasticity number of at least 80, a polymeric latex of a styrene-acrylonitrile copolymer composed predominantly of styrene polymerized therein, in amounts from about 0.5 part to about 1.5 parts by weight of said copolymer per part of polybutadiene, and a mixture of styrene and acrylonitrile monomers in amount between about 1 part and about 3 parts by weight per part of polybutadiene, said mixture of monomers being composed predominantly of styrene, polymerizing the resulting mixture by heating in the presence of a free-radical polymerization catalyst, and recovering therefrom a grafted polymer having a resin to rubber ratio of between about 65/35 and about 75/25 wherein the resin component represents the amount of styrene and acrylonitrile grafted to the polybutadiene plus the amount of free styrene-acrylonitrile copolymer present and the rubber component represents the amount of polybutadiene initially present.

5. A process according to claim 4 wherein the polymerization is conducted at a temperature between about 30° C. to about 90° C.

6. A process according to claim 5 wherein the styrene-acrylonitrile copolymer is composed of between about 65 and 75 percent styrene, and about 25 to 35 percent acrylonitrile respectively polymerized therein.

7. A process according to claim 6 wherein the mixture of styrene and acrylonitrile monomers is composed of between about two and three parts by weight of styrene per part of acrylonitrile.

8. A process for producing styrene-acrylonitrile grafted polybutadiene resins which includes the steps of admixing a latex of polybutadiene having a Mooney plasticity number of at least 80 with a polymeric latex of a styrene-acrylonitrile copolymer composed predominantly of styrene polymerized therein in amounts of between about 0.5 and 1.5 parts by weight of the copolymer per part of polybutadiene, heating the resultant mixture to a temperature of between about 30° C. to about 90° C. in the presence of a free-radical polymerization catalyst while slowly adding and polymerizing a mixture of styrene and acrylonitrile monomers composed predominantly of styrene, and recovering the grafted polymer thus produced.

9. A process according to claim 8 wherein the styrene-acrylonitrile copolymer contains between about 65 and 75 percent styrene polymerized therein.

10. A process according to claim 9 wherein the mixture of monomers is composed of between about two to three parts by styrene per part of acrylonitrile.

11. A strong, tough thermoplastic styrene-acrylonitrile grafted polybutadiene material made by admixing a latex of polybutadiene with a latex of a styrene-acrylonitrile copolymer composed predominantly of styrene polymerized therein, in amounts of about 0.5 to about 1.5 parts by weight of said copolymer per part of said polybutadiene, adding styrene and acrylonitrile monomers to said mixture of latices, heating the monomer-containing mixture in the presence of a free radical polymerization catalyst and polymerizing the styrene and acrylonitrile and recovering the polymeric product thus produced having a milling time at 170° C. of between about 5 to about 8 minutes.

12. A strong tough thermoplastic styrene-acrylonitrile grafted polybutadiene material having a resin to rubber ratio of between about 65/35 to about 75/25 wherein the resin component represents the amount of styrene and acrylonitrile grafted to the polybutadiene plus the amount of free styrene-acrylonitrile copolymer present and the rubber component represents the amount of polybutadiene initially present, made by admixing (a) a latex of polybutadiene having a Mooney plasticity number of at least 80, (b) a latex of a styrene-acrylonitrile copolymer composed of between about 65 to about 75 percent styrene and between about 25 to about 35 percent acrylonitrile respectively polymerized therein, in amounts of about 0.5 part to about 1.5 parts by weight of said copolymer per part of said polybutadiene, and (c) styrene and acrylonitrile monomers in amounts of between about one to about three parts of monomers per part of polybutadiene, heating the mixture in the presence of a free radical polymerization catalyst until a homogeneous thermoplastic polymeric product is produced said material being characterized by improved heat-processability.

References Cited in the file of this patent

UNITED STATES PATENTS 2,802,808    Hayes _____ Aug. 13, 1957

FOREIGN PATENTS 649,166    Great Britain _____ Jan. 17, 1951
744,455    Great Britain _____ Feb. 8, 1956

OTHER REFERENCES

Ellis: Chemistry of Synthetic Resins, volume 1, page 241 (1935), published by Reinhold, New York.